UNITED STATES PATENT OFFICE.

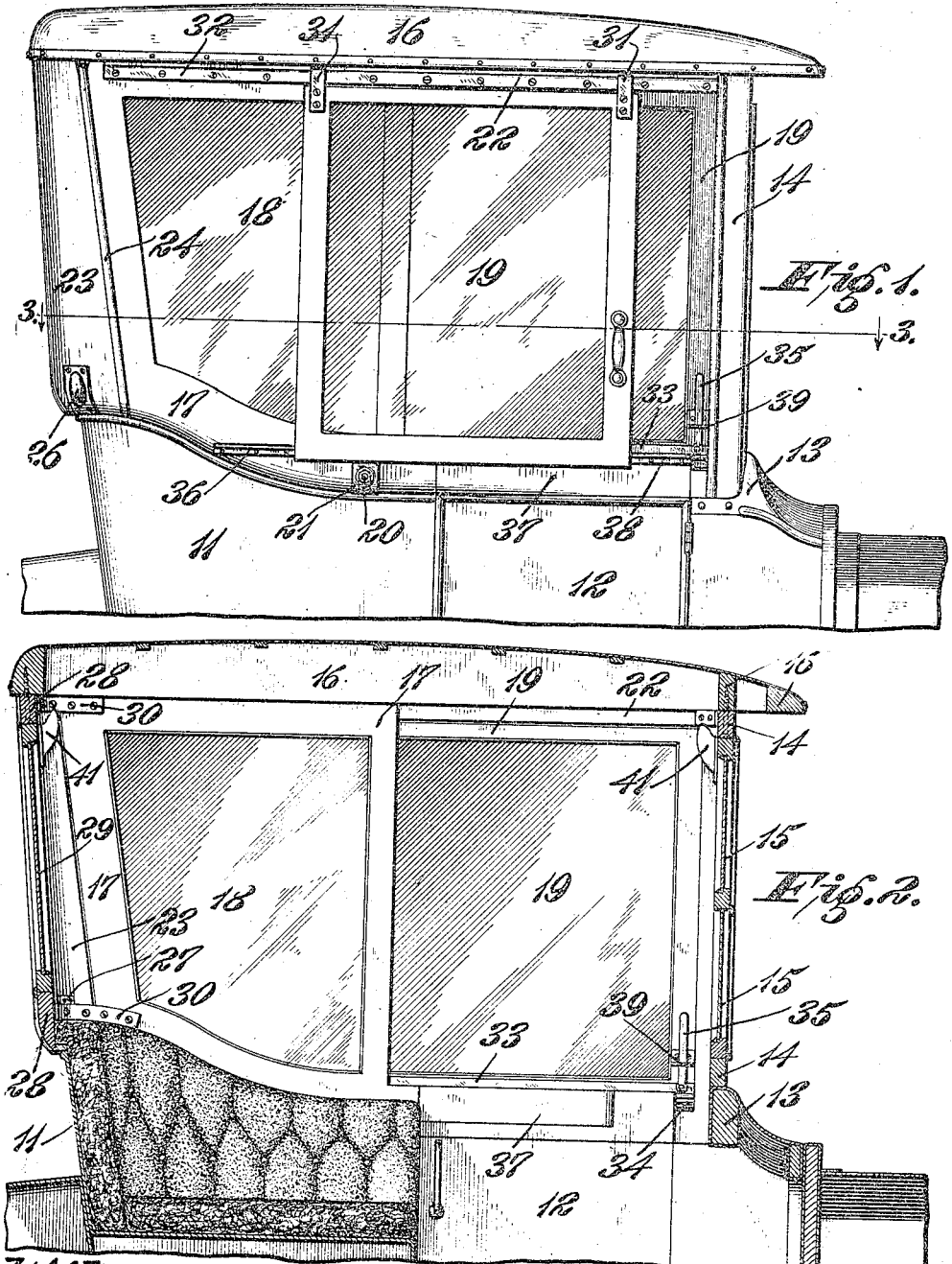

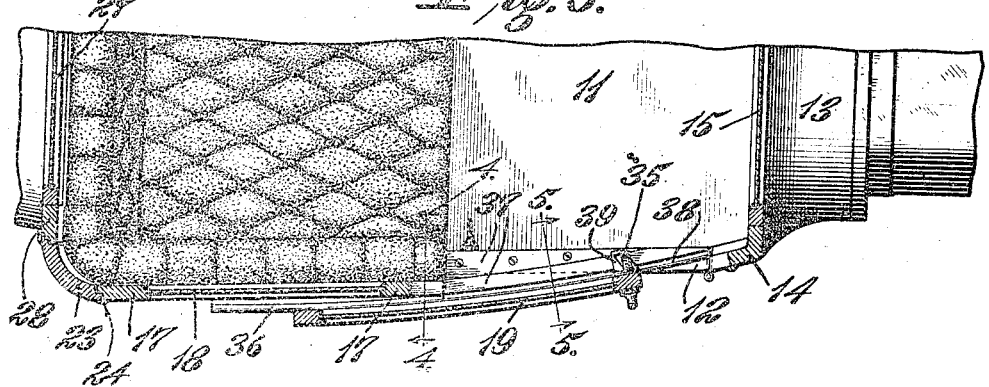
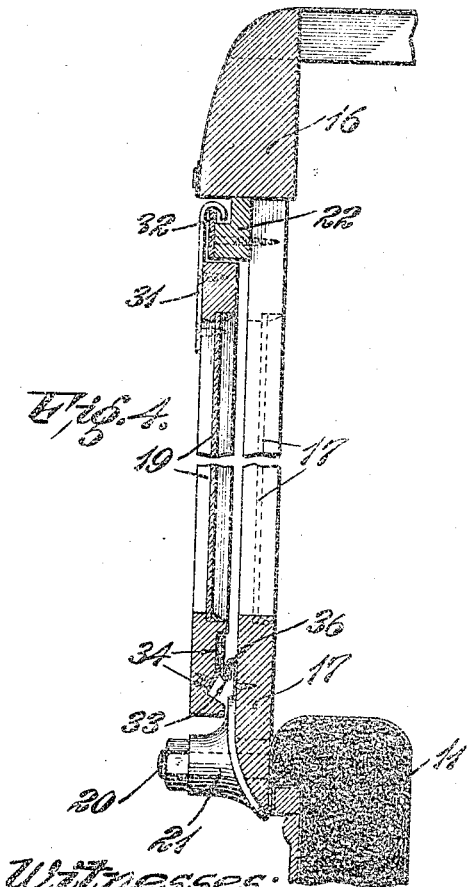
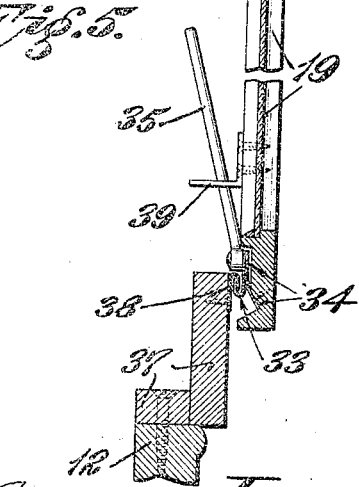

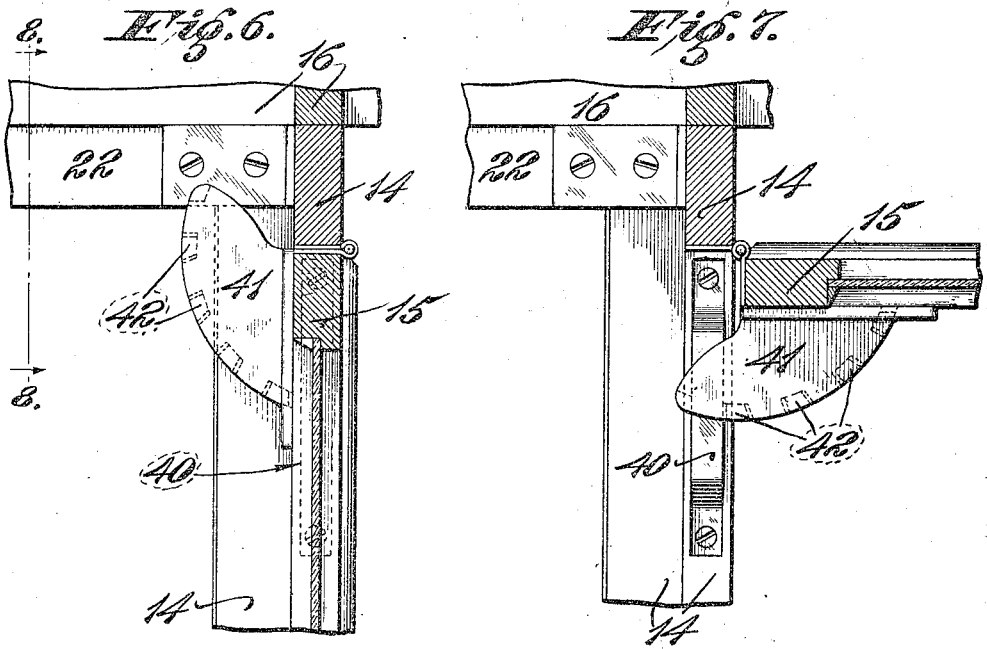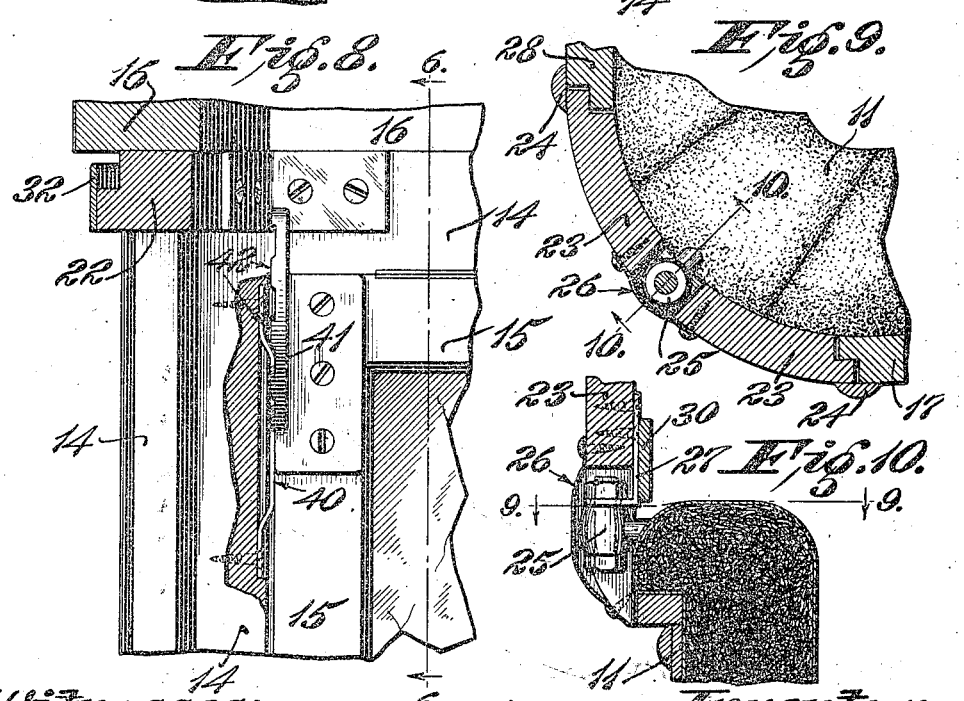

REGINALD HEINZELMAN, OF BELLEVILLE, ILLINOIS, ASSIGNOR TO KOUPET AUTO TOP COMPANY, OF BELLEVILLE, ILLINOIS, A CORPORATION OF ILLINOIS.

CLOSED TOP FOR VEHICLES.

1,298,942.  Specification of Letters Patent.  Patented Apr. 1, 1919.

Application filed October 8, 1915. Serial No. 54,710.

*To all whom it may concern:*

Be it known that I, REGINALD HEINZELMAN, a citizen of the United States, and a resident of the city of Belleville, county of St. Clair, and State of Illinois, have invented a new and useful Improvement in Closed Tops for Vehicles, of which the following is a specification.

This invention relates particularly to knock-down tops having front, sides and back forming a complete inclosure and adapted to be fitted to open automobile bodies to convert them into closed bodies. Automobile bodies of the same style and size and made by the same manufacturer differ slightly in their principal dimensions, so that heretofore ready made tops have had to be fitted to the body, and could not be applied by automobilists.

The objects of this invention are to provide for the easy putting together and fitting on of the top upon a body which differs slightly in size from the model; to provide for the easy adjustment of the doors and windows in open or partly open position, and to insure that they stay put in the desired positions of adjustment; and to prevent vibration and rattling of the parts of the top.

The invention consists in the parts and arrangements hereinafter described, and is more particularly defined in the claims.

The accompanying drawings illustrate the invention applied to a Ford automobile, but the invention is not restricted to any particular make of automobiles.

In the drawings, wherein the same characters are applied to like parts in the several views, Figure 1 is a side elevation of a top embodying the invention fitted to an automobile;

Fig. 2 is a vertical section through the same on the longitudinal center line of the vehicle;

Fig. 3 is a horizontal section of one-half of the top on the line 3—3 in Fig. 1;

Fig. 4 is a vertical cross-section through one side wall of the top, on the line 4—4 in Fig. 3, looking toward the rear;

Fig. 5 is a vertical cross-section through the door and top on the line 5—5 in Fig. 3, looking toward the front;

Figs. 6 and 7 are vertical cross-sections of the upper portion of the front wall or wind shield on the line 6—6 in Fig. 8, Fig. 6 showing the window closed, and Fig. 7 showing it open;

Fig. 8 is a vertical cross-section of the front portion of a side wall on the line 8—8 in Fig. 6, showing the inside of the front window in elevation;

Fig. 9 is a horizontal cross-section of a portion of the top at a rear corner post, on the line 9—9 in Fig. 10; and Fig. 10 is a vertical cross-section of the same on the line 10—10 in Fig. 9.

The automobile shown in the drawings has a one-seated body 11, fitted with side doors 12 and a cowl 13 of ordinary construction. The top consists of separate wall sections and roof sections which are secured together in place on the body to form a rigid upper portion thereof. The front wall section consists of a frame 14 which supports the hinged windows or sashes 15 of the wind shield. The bottom rail of the front wall section rests upon the cowl 13 and is secured thereto by any suitable means, such as screws extending vertically down through the rail into the cowl. Similarly, the top rail of the front wall section is screwed to the under side of the frame 16 of the roof section.

The side wall sections 17 have glass windows 18 over the arms of the seat, and sliding doors 19 suspended outside of the windows for closing the space over the swinging doors 12 of the automobile body. The lower rail of each side wall section conforms to the contour of the side of the body outside of the top portion of the upholstery around the seat, the lower edge of the rail following the bead which marks the division line between the top of the body and the upholstery. The side wall sections are supported on the fixed side brackets or irons 20, which are customarily fitted to the automobile body for carrying the folding top with which open automobiles are usually equipped. These side brackets 20 usually project sidewise horizontally from the upholstery near the front end of the seat arm, and the bottom rails of the side sections 17 are notched to fit down past them. A clamping plate 21 is arranged on the outer end of each bracket 20, and a nut on the bracket outside of the plate holds the plate in against the side of the lower rail and clamps the side section against the upholstery of the seat. The lower edge of the plate 21 hooks under the lower edge of the bottom rail of the side section to hold it up.

The upper rails of the side wall sections fit under the roof section 16 and help to support it. A door track 22 is secured alongside of the upper rail of each side section, extending forward to the top end of the adjacent side post of the frame 14 of the front wall section, to which it is secured by an angle brace or other suitable means. The door track is secured to the underside of the side members of the frame 16 of the roof section by vertical screws or other suitable means.

The rear edges of the side sections 17 are notched or grooved along their outer corners to receive the overlapping tongues of the corner posts 23 which support the rear portion of the top. The vertical joints between the side sections 17 and corner posts 23 are covered on the outside by metal bead strips 24 which are secured to the edges of the corner posts. The upper ends of the bead strips 24 are bent outwardly and secured to the under side of the frame 16 of the roof section by screws or other suitable fastenings. The corner posts 23 are curved to conform to the curved outer corners of the body, and their lower ends are notched upward to enable the posts to fit down over the rear bracket irons 25 which are usually provided for supporting the folding top, and which project outwardly from the rear corners of the top edge of the seat upholstery. These notches are covered by sheet metal covers 26 to conceal the brackets 25 and give a neat appearance to the top. An angle bracket 27 is secured to the inside of each post over the notch at its lower end, with one leg of the bracket projecting into the notch to rest upon the top of the fixed body bracket 25 therein and the two brackets are secured together by a bolt and nut, as shown in Fig. 10. The posts are thereby solidly supported upon the body at their lower ends.

The rear wall section consists of a rectangular frame 28 inclosing a hinged window 29 which is pivoted at its top edge to the under side of the top rail of the frame 28 to swing outwardly. The upper rail of the rear wall section is secured beneath the rear member of the frame 16 of the roof section by vertical screws which pass up through the rail into the frame of the roof. The side members of the frame 28 are grooved along their outer edges to receive the edge tongues of the corner posts 23, and the vertical joints between them are covered by metal bead strips in the same manner as the joints between the corner posts and side sections 17. Curved irons or metal straps 30 are fitted to the curved inner side of each corner post at its top and bottom ends, and the ends of these irons 30 are secured to the adjacent members of the side wall sections and rear wall section.

The doors 19 are suspended from the track 22 by means of hangers 31 at their upper corners. The upper ends of the door hangers of each door hook over and slide upon a metal strip 32 which is secured along the outer side of the track 22 below the overhanging edge of the roof section. The strips 32 may be curved in at their front ends toward the center line of the vehicle to make the top narrower in front. In case the track is curved in at the front the doors may be curved also, as shown in Fig. 3. The lower rail of the door is recessed on its inner side near its bottom edge to receive the locking bar 33, which is a sheet metal strip U-shaped in cross-section and extends the full length of the door. The locking bar is secured to the inside of the door by hinges 34 at each end, and is provided with a pivoted handle 35 at the front end of the door for manipulating it. The inner portion of the U-shaped locking bar slides in an inverted U-shape guide strip 36 which is secured along the outside of the lower rail of each side section 17. This guide strip 36 may be straight or curved throughout its length in conformity with the track strips 32.

The side doors 12 of the body are fitted with extra top rails 37 which project up inside of the bottom rails of the sliding doors 19 to close the spaces between the top edges of the swinging doors 12 and the bottom rails of the sliding doors 19. The top rails 37 have guide strips 38 secured along the outside of their top edges, which are in alinement with the guide strips 36 on the side wall sections when the doors 12 are closed. The sliding doors may be locked and securely held in any position by clamping them down on the track strips 32 between the latter and the guide strips 36 and 38. The handle 35 which swings the locking bar 33 to clamp the sliding door is held in clamping position by the bracket 39, which is provided with teeth on one side for retaining the handle in locking position as in my United States Patent No. 1,196,777, dated Sept. 5, 1916.

The windows of the front and rear sections are held in shut, partly open or open position by means of a spring catch arrangement consisting of a thin flat steel spring 40 and a notched sector 41, as shown in Figs. 6, 7 and 8. The spring has offset ends which are let into the edge of the frame, the flat middle portion projecting slightly from the frame, and the notched sector 41 is screwed on the inner side of the window sash at its edge to swing across the flat face of the spring with the movement of the window. The notches 42 are on the outside of the sector, and project sidewise beyond the edge of the window to engage the spring. The ends of the notches are inclined to permit them to ride over the spring when the window is swung by hand, and the last notch has a square shoulder which strikes against the edge of the spring in full open position of the window to prevent its further movement. The spring is stiff enough to hold itself in the notch under ordinary jolts and wind pressure to retain the window in adjusted position. The sectors 41 are made rights and lefts, two being used for each window arranged one at each side. For the lower window of the front section the arrangement of the springs and sectors is reversed, the springs being let into grooves in the sash and the sectors being screwed on the inside of the frame.

The advantages of the foregoing construction are that it is light and strong and easily applied to the automobile body, and there are no loose parts or free ends to rattle. In applying the top, the front section is set in place and secured to the cowl of the body, the side sections are loosely bolted on to the sides of the body, and the front ends of the tracks 22 for the doors are fastened to the front section. The doors are hung on the tracks before they are secured to the front section. The notches in the lower rails of the side sections to receive the side brackets 20 are wide enough to allow for the small variations in the distance between the cowl and the front edge of the seat, and the clamp plates 21 permit the lower edges of the side sections to be raised or lowered slightly to conform to the height of the side of the body.

Next, the rear corner posts 23 are set in place over the corner brackets 25, with the rear wall section in position between them, and the bolts 26 are inserted to hold the lower ends of the posts and wall sections in place. The hole in the bracket 27 for the bolt 26 is slightly larger than the body of the bolt, and the edges of the corner posts and side sections are slightly spaced apart endwise, as shown in Fig. 9, in order to provide for adjusting the sections to bodies of slightly different dimensions. The variations in dimensions of the body are seldom over one-half of an inch, and this amount can be taken care of by the corner post construction without exceeding the limits within which the beads 24 will conceal the spaces between the corner posts and side and end wall sections.

The roof section is put in place next, and the front and rear wall sections are screwed up against its under side. The tracks for the doors are also screwed up against the frame of the roof section, thereby lining up the side sections, after which the side clamps 21 are bolted on hard. The corner irons 30, which are already secured to the corner posts, are screwed to the side and rear wall sections, and the nuts on the brackets 25 are tightened up, thereby rigidly securing the side and rear wall sections together and to the body. The beads 24 are screwed on to the posts and wall sections and their top ends are screwed to the under side of the roof section, thereby preventing rattling of these joints. The top rails are screwed on the tops of the side doors of the body with the guide strips in alinement with the ends of the guide strips on the side sections, which completes the operation of applying the top.

The interior of the top is trimmed where the woodwork is exposed by tacking on cloth upholstery. This upholstery may be tacked in place before the top is shipped from the factory except for the edges of the pieces which line the corner posts and the lower edges of the pieces which line the frame of the roof section. These edges are tacked in place after the top is applied to the automobile body. Instead of tacks, glove fasteners may be used to hold the upholstery in place.

The invention is not restricted to the detail constructions shown in the drawings, which are for illustration only.

I claim the following as my invention:

1. A knock-down top adapted for attachment to automobile bodies, said top comprising side and rear wall sections having means for supporting them from the side brackets of the automobile body, corner posts loosely fitting between said side and rear wall sections and having means for supporting them from the rear corner brackets of the body, said corner posts being adjustable with respect to said side and rear wall sections, means for securing said side and rear wall sections to said corner posts to hold them in adjusted position, and strips for concealing the gaps between said corner posts and wall sections.

2. A closed vehicle body having a door divided into a lower portion and an upper portion, the lower portion being hinged to the body to swing outward and the upper portion being suspended from a track to slide endwise to one side of the door opening, an inverted track section at one side of the door opening near the lower edge of said sliding door, a second inverted track section on the top edge of said swinging door adapted to line up with said first inverted track section in closed position of said swinging door, and means on said sliding door coöperating with said inverted track sections for clamping said sliding door to said tracks in any position lengthwise thereof.

3. A vehicle door divided into a lower portion and an upper portion, the lower portion being hinged to swing outward and the upper portion being suspended from a track to slide endwise to one side of the door opening, an inverted track section at one side of the door opening near the lower edge of said sliding door, a second inverted track section on the top edge of said swinging door adapted to line up with said first inverted track section in closed position of said swinging door, and means on said sliding door coöperating with said inverted track sections for clamping said sliding door along its full length to said tracks in any position lengthwise thereof.

4. A knock-down attachable top for vehicle bodies, said top comprising a plurality of side wall sections adjustable with respect to each other to fit the body, a roof section adapted to be secured to said side wall sections, the roof section having a frame with a flat under surface resting on and projecting over the top edges of the side wall sections whereby the latter may be adjusted laterally to fit the body without displacing said roof section, and means for concealing the joints between said side wall sections.

5. A knock-down attachable top for vehicle bodies, said top comprising a plurality of side wall sections and intermediate sections adjustable with respect to each other to fit the body and adapted to be secured together at their ends in adjusted position, means for closing the gaps between said wall sections, and a roof section covering said side wall sections, the roof section having a frame with a flat under surface resting on and projecting over the top edges of the side wall sections, and means for securing the top edges of said side wall sections to said roof frame in any desired position of lateral adjustment.

6. A knock-down attachable top for vehicle bodies, said top comprising a plurality of side wall sections adapted to be adjusted to a vehicle body and secured together at their ends in adjusted position, strips for concealing the gaps between the ends of said side wall sections, and a roof section covering said side wall sections, the roof section having a frame projecting over the top edges of the side wall sections and adjustable laterally with respect thereto, and means for securing the top edges of said side wall sections to said roof frame in any desired position of lateral adjustment.

Signed at St. Louis, Missouri, this 4th day of October, 1915.

REGINALD HEINZELMAN.